United States Patent [19]
Reynier et al.

[11] Patent Number: 5,231,274
[45] Date of Patent: Jul. 27, 1993

[54] CARD READER

[75] Inventors: Helena M. A. Reynier, Helmond; Johannes A. J. Van Oosterhout, Nieuwegein, both of Netherlands

[73] Assignee: AMP Incorporated, Harrisburg, Pa.

[21] Appl. No.: 757,357

[22] Filed: Sep. 10, 1991

[30] Foreign Application Priority Data

Sep. 13, 1990 [GB] United Kingdom ............... 9020002

[51] Int. Cl.⁵ .......................................... G06K 19/06
[52] U.S. Cl. .................................. 235/441; 439/886; 439/887; 439/64; 439/66
[58] Field of Search .................. 235/441, 492; 439/64, 439/66, 886, 887

[56] References Cited
U.S. PATENT DOCUMENTS 4,236,667  12/1980  Crowley et al. ................. 235/443
4,769,908   9/1988  Olsson ............................ 29/884
4,780,603  10/1988  Hamada ........................... 235/441

Primary Examiner—Paul M. Dzierzynski
Assistant Examiner—Don Wong
Attorney, Agent, or Firm—Bruce J. Wolstoncroft

[57] ABSTRACT

A card reader (2) especially for use in connecting gold plated pads on a subscribers identity module card (4) to respective tin plated pads on a printed circuit board (6) in a car telephone handset, comprises an insulating frame (8) having spigots (26) for fixing it to the circuit board 96), and a metal cover (12). A bar (22) spanning the frame (8) supports contact elements (10) molded thereinto. Each contact element (10) has a 10 contact spring (40) provided with a bowed, gold plated contact surface (5) near its free end for engaging a respective gold plated pad on the card (4), and intermediate its ends, an oppositely bowed, tin plated, contact surface (44) for engaging a respective tin plated pad on the circuit board 96). With the card (4) resting on a ledge (18) in the frame (8), the metal cover (12) is latched to the frame (8) to force the contact surfaces (44 and 50) against their respective pads. The contact springs (40) are so configured that the contact forces (F1 and F2) applied by, and the length of wipe of, the contact surfaces (44 and 50) is appropriate to the plating thereon and the plating on the pads engaged thereby.

11 Claims, 9 Drawing Sheets

CARD READER

FIELD OF THE INVENTION

This invention relates to a card reader comprising a card support, a set of elongate contact springs and means for pressing contact surfaces of said contact springs into electrical contact with contact surfaces of respective electrically conductive first pads on a card on said card support and with respective electrically conductive second pads on a circuit board.

BACKGROUND OF THE INVENTION

The invention relates more particularly to such a card reader for connecting pads on a telephone subscriber's identity module card, known as a SIM card, to respective pads on a printed circuit board in a car telephone hand set are known in the industry. In many instances, the pads on the SIM card are gold plated while those on the printed circuit board are tin plated. Since gold plated contact surfaces need to be engaged by the contact surfaces of the contact springs with a lower contact force than do tin plated contact surfaces, in order to provide an effective electrical connection between contact spring and pad, the need arises for the contact forces to be adapted to the different contact surface materials if undue wear upon the gold contact surfaces is to be avoided. This requirement is not met by prior art card readers. Also, many card readers require substantial dimensions thereby making them ineffective in various instances.

SUMMARY OF THE INVENTION

According to one aspect of the invention a card reader as defined in the first paragraph of this specification is characterized in that, where the contact surfaces of the first pads are of a first material and the contact surfaces of said second pads are of a second material; each contact spring has a first contact surface of said first material for engaging the contact surface of a respective first pads and a second contact surface of said second material for engaging the contact surface of the respective second pad, said first and second contact surfaces being provided on oppositely directed bights spaced from each other longitudinally of the contact spring so as to provide, in effect, two independent contact springs, one for exerting a first contact force appropriate to said first material for pressing said first contact surface against the contact surface of said first pad, and the other for exerting a second contact force appropriate to said second material for pressing said second contact surface against the contact surface of said second pad.

The contact springs are also preferably configured to ensure that as they are compressed the first and second contact surfaces wipe their respective pads to the extend needed in respect of said first and second materials.

The contact springs can conveniently be molded into a support bar which may for example be only 1.0 mm. Also with a view to reducing the height of the card reader, the card support may be in the form of a flat insulating frame spanned by the support bar, the pressing means being in the form of a cover, for the frame.

According to another aspect of the invention a card reader as defined in the first paragraph of this specification is characterized in that said card support is in the form of an elongate insulating frame spanned transversely thereof by a support bar and having a peripheral, card supporting upper ledge, at least one row of contact springs, each having a support portion molded into said bar, the contact springs projecting from the bar in parallel relationship lengthwise of the frame, the frame having means for securing it to the circuit board with a lower face of the frame thereagainst, each contact spring having an upwardly bowed contact surface for engaging a respective one of said first pads and a downwardly bowed contact surface for engaging a respective one of said second pads, said pressing means comprising a cover which can be secured to the frame to press a card on said ledge down against said first contact surfaces thereby to press said second contact surfaces against said second pads.

The contact springs may be arranged in two rows, the contact springs of the rows projecting from opposite sides of the bar, their support portions being cranked and interdigitated within the bar.

One or more further frames identical with said elongate insulating frame may be stacked thereon in superposed relationship, being held in such relationship by means of the cover.

BRIEF DESCRIPTION OF THE DRAWINGS

For a better understanding of the invention reference will now be made by way of example to the accompanying drawings in which.

DETAILED DESCRIPTION OF THE INVENTION

Figure 1:
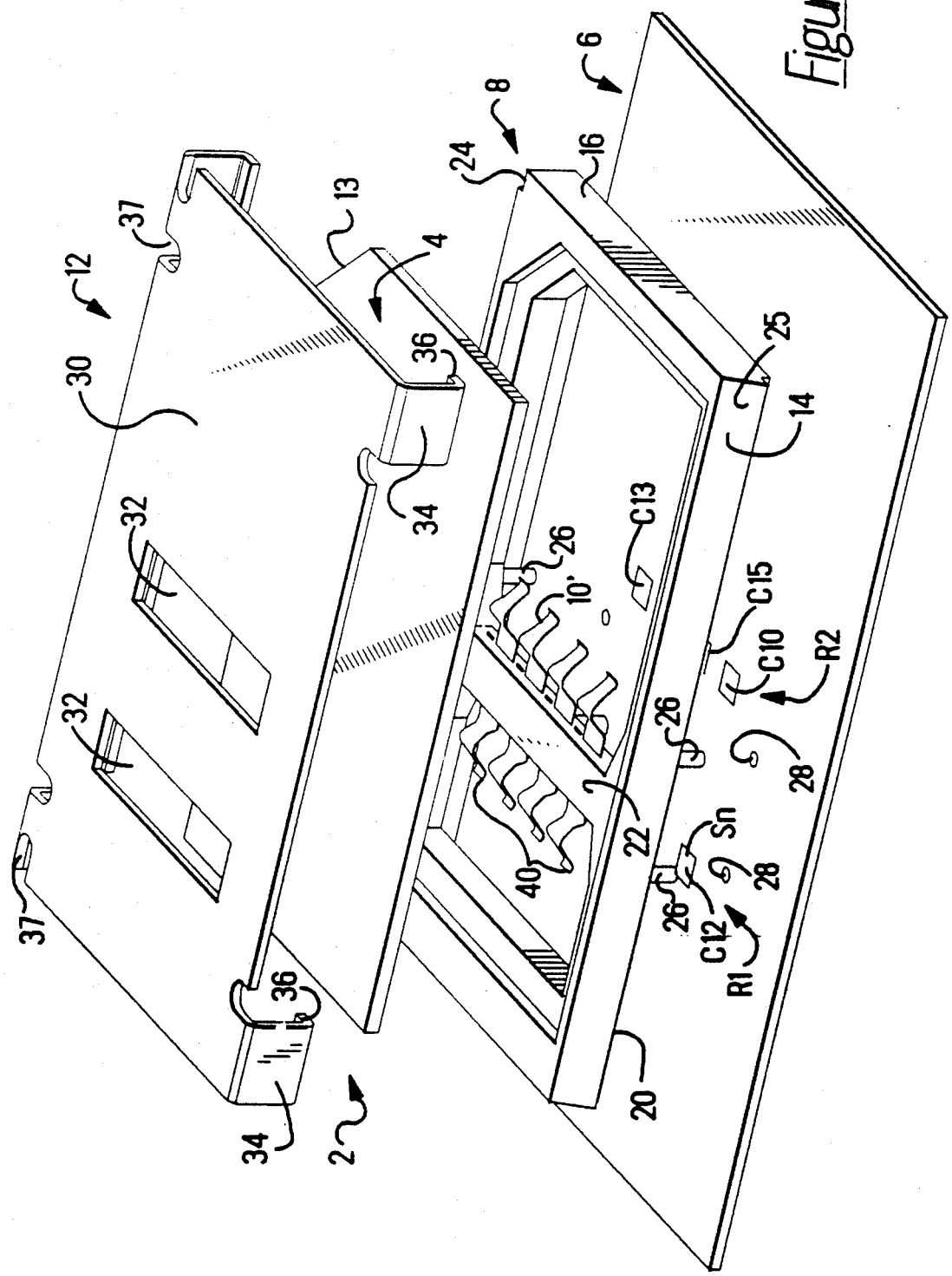
FIG. 1 is an exploded isometric view of a card reader for connecting contact pads on a SIM card to respective contact pads on a printed circuit board in a telephone hand set.

As shown in FIG. 1, a card reader 2 for connecting contact pads on a SIM card 4 to respective contact pads on a printed circuit board 6 in a telephone subscribers hand set (not shown), comprises an insulating frame 8 supporting electrical contact elements 10, and a metal cover 12.

Figure 13:
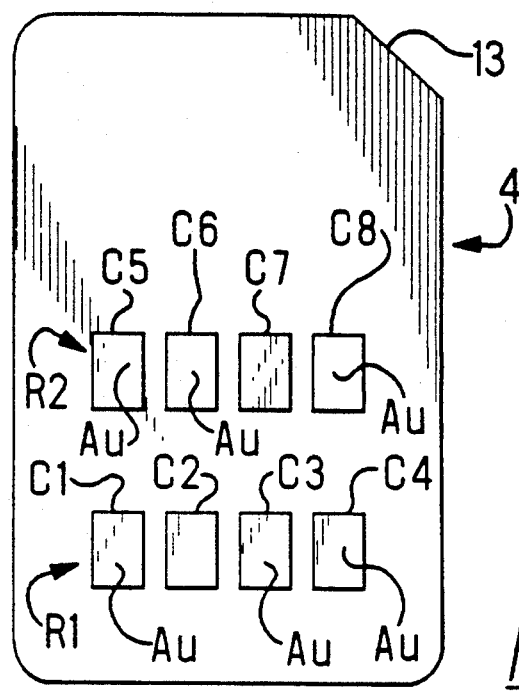
FIG. 13 is an under plan view of the SIM card.

As shown in FIG. 13, the card 4 which is substantially rectangular and has a clipped corner 13 for polarization purposes, has two spaced rows R1 and R2, of constantly spaced contact pads C1 to C8, which have gold plated contact surfaces Au thereon, there being four pads in each row and each pad of one row being opposite to a pad of the other row.

As best seen in FIG. 1, the printed circuit board 6 has two spaced rows R1' and R2' of constantly spaced contact pads C9 to C16, which have tin plated contact surfaces Sn, the pads of each row being constantly spaced from each other by the same distance as the contact pads of the rows R1 and R2, and each pad of one row being opposite to a respective pad of the other row. The rows R1 and R2 are, however, spaced from each other by a greater distance than the rows R1' and R2'. As explained below, the card reader 2 is arranged electrically to connect each of the contact pads C1 to C4 of the card 4 to a respective contact pad C9 to C12 of the circuit board 6, and electrically to connect each of the contact pads C5 to C8 of the card 4, to a respective contact pad C13 to C16 of the board 6, thereby electrically to connect circuitry (not shown) on the card 4 to appropriate circuitry (not shown) on the circuit board.

Figure 2:
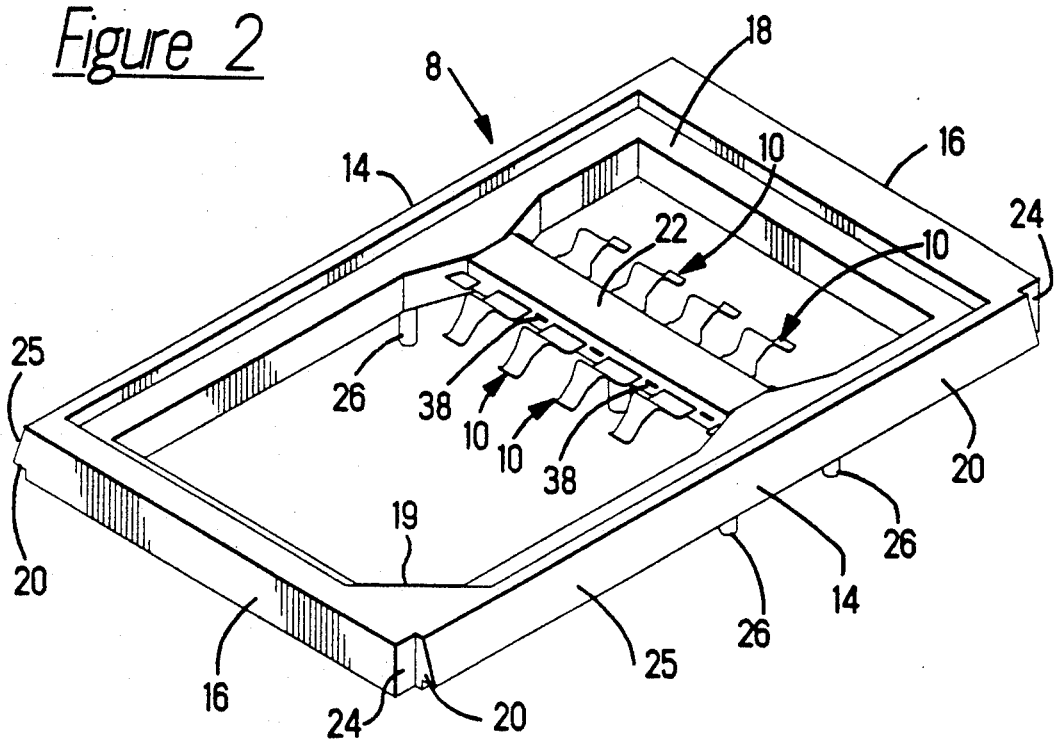
FIG. 2 is an enlarged isometric view of a molded insulating frame of the card reader.
Figure 8:
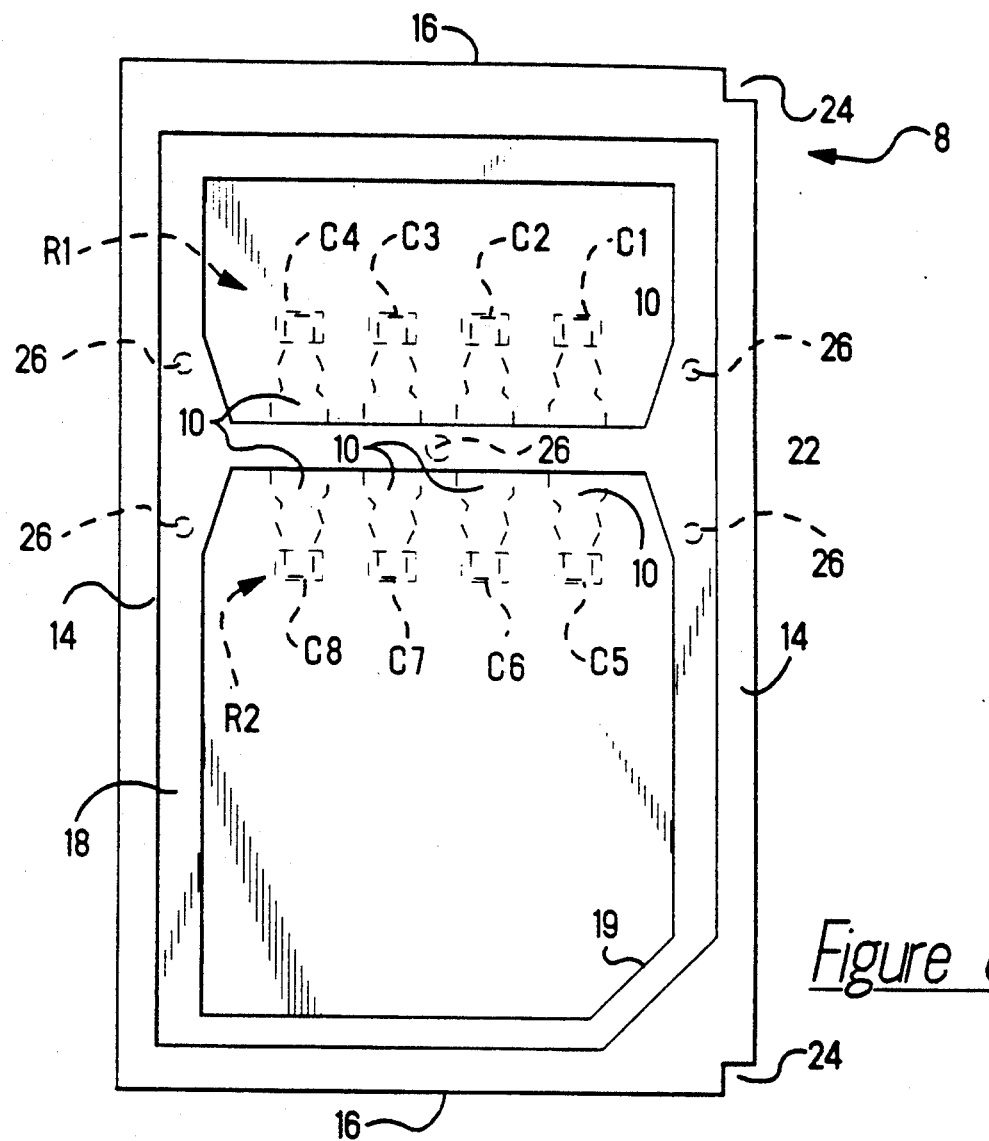
FIG. 8 is a top plan view of the car reader with the cover removed from the frame.
Figure 9:
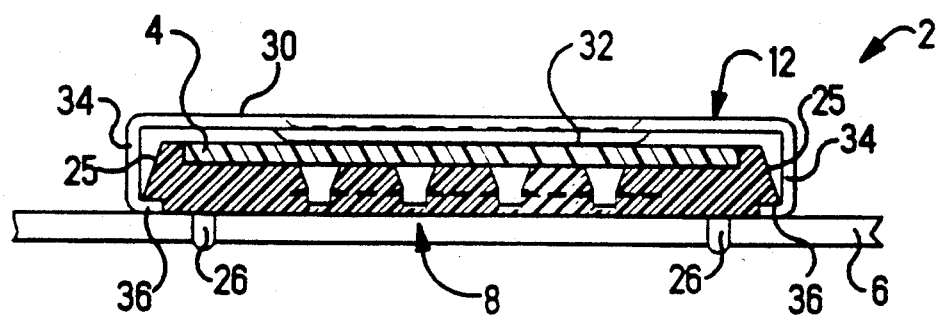
FIG. 9 is a cross-sectional view of the card reader when mounted on the printed circuit board.
Figure 10:
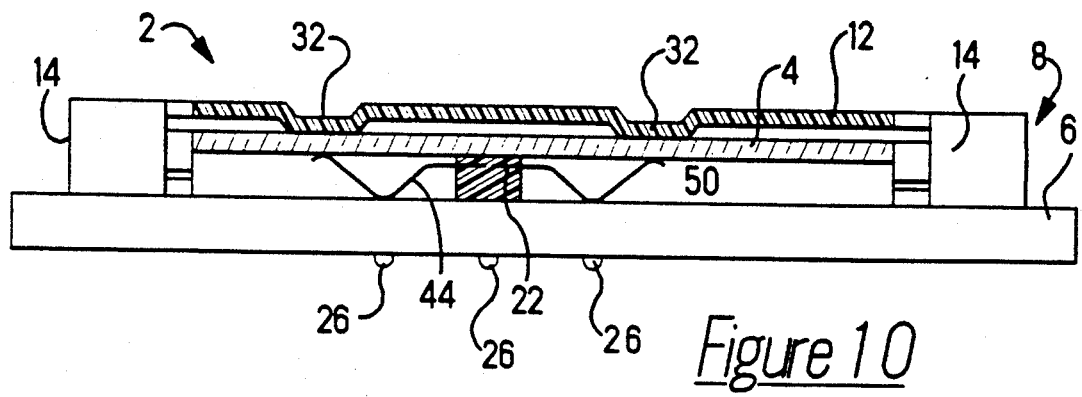
FIG. 10 is a longitudinal sectional view of the card reader when mounted on the printed circuit board.

The insulating frame 8, which has been molded from a suitable plastics material, will now be described in detail with particular reference to FIGS. 1, 2, and 8. The frame 8, which is elongate and is substantially rectangular as seen in plan view, comprises opposite side walls 14 and opposite end walls 16, which co-operate to define an internal, peripheral, upwardly facing ledge 18 for supporting a card 4. The ledge 18 extends about the whole periphery of the frame 8 excepting at one corner thereof where the ledge 18 is interrupted by an oblique polarizing flat 19 matching the clipped corner 13 of the card 4. Each side wall 14 defines a downwardly facing, cover latching, external shoulder 20. The side walls 14 are spanned by a transverse contact element support bar 22 extending normally of the walls 14 and supporting two opposed rows of contact elements, each consisting of four contact elements 10. Each contact element 10 of one row is aligned with, and extends in the opposite direction to, a contact element 10 of the other row, normally of the bar 22. The intersection between one of the side walls 14 and each of the end walls 16 adjacent thereto, is formed with a triangular, external cut-out 24. As best seen in FIG. 9, each side wall is formed with a downwardly divergent cam surface 25. There depends from each side wall 14, on either side of, and proximate to, the bar 22, as well as from the center of the bar 22, a mounting spigot 26 for insertion into a respective hole 28 in the circuit board 6. The frame 8 can be permanently, secured against the board 6, by heat sealing the spigots 26 thereto at their free ends.

The cover 12 will now be described in detail with particular reference to FIGS. 1, 6, 7 and 9. The cover 12, which has been stamped and formed from a single piece of sheet metal stock, comprises a substantially rectangular, elongate plate 30 provided with a pair of spaced, parallel, downwardly projecting contact pressure beads 32 which are aligned with the respective rows R1 and R2 of contact pads of the card 4 when the latter is supported on the ledge 18. The beads 32 extend at right angles to the longitudinal axis of the plate 30. There depends from each corner of the plate 30, a resilient latch arm 34 terminating in an inwardly directed flange 36. On one side of the plate 30, a release tool receiving slot 37 extends between each of the latch arms 34 and the plate 30.

The cover 2 can be latched to the frame 8 by pressing it down there against so that the latch arms 34 of each opposite pair are resiliently spread away from each other by the engagement of their flanges 36 with the respective cam surface 25, until the arms 34 finally resile, with a snap action, so that the flanges 36 overlie the respective shoulders 20 whereby the cover 12 is firmly but releasably secured, in a home position, to the frame 8. In order to remove the cover 12 from the frame 8, a screwdriver blade can be inserted through each slot 37 into the cut out 25 therebeneath, to cam the corresponding latch arm 34 resiliently outwardly, in order to allow the cover 12 to be removed from the frame 8.

Figure 11:
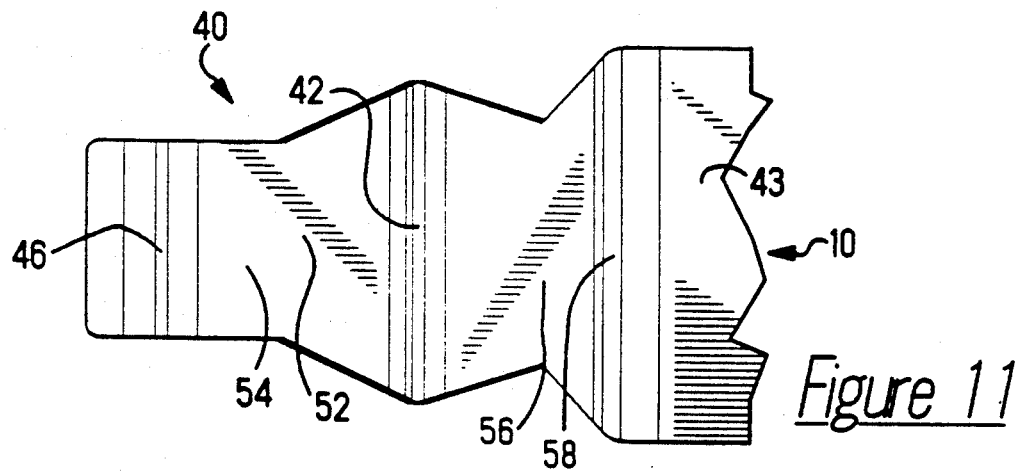
FIG. 11 is an enlarged plan view of an electrical contact element of the support bar.
Figure 12:
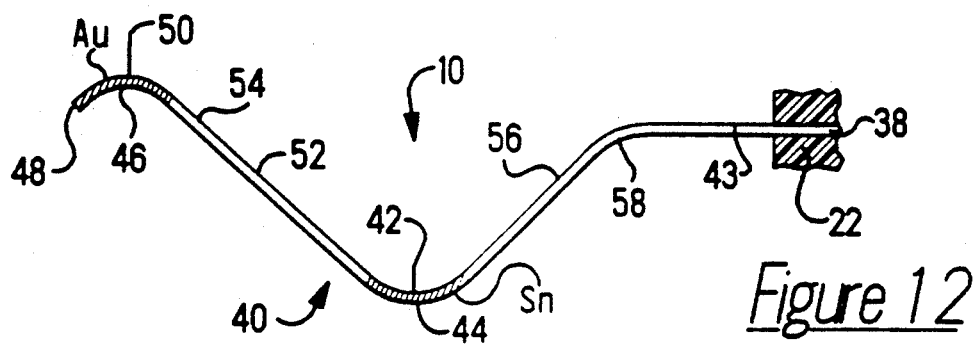
FIG. 12 is a side view of FIG. 11.

The bar 22 and its contact elements 10 will now be described in detail with a particular reference to FIGS. 3 to 5, 11 and 12. Each contact element 10, which has been stamped and formed from a single piece of sheet metal stock, comprises a planar mounting portion 38 molded into the bar 22, and a cantilever contact spring 40 projecting from the bar 22. As best seen in FIGS. 11 and 12, the contact spring 40 comprises a bight 42, intermediate its ends, describing an arc of 92° and defining a convex first contact surface 44 provided with tin plating Sn. The contact spring 40 has a further bight 46, which is of constant width as seen in FIG. 11 and extends back from the free end 48. The bight 46 is bowed in the opposite direction to the bight 42 and describes an arc of 88°. The bight 46 defines a convex contact surface 50 provided with gold plating Au and being directed oppositely to the contact surface 44. The bight 46 is connected to the bight 42 by a first planar arm 52, the width of which increases towards the bight 42 from a constant width part 54 of the arm 52 which part is of the same width as the bight 46 and extends back therefrom. The width of the contact spring 40 increases at a constant rate from the part 54 up to the crest of the bight 42. From said crest, the width of the bight 42 decreases at a constant rate towards a second planar arm 56 connecting the bight 42 by way of a shallower bight 58 to a third planar arm 43 projecting at right angles from the bar 22 and being coplanar with the portion 38. The width of the arm 56 decreases at a constant rate up to the bight 58, but the width of the contact spring 40 increases rapidly at a constant rate from the junction of the arm 56 with the bight 58 up to a position just beyond the bight 58, the width of the arm 43 thereafter being constant up to the bar 22 and exceeding the width of the crest of the bight 42. The bight 58 is bowed in a direction obliquely away from the bight 42.

By virtue of the configuration, described above, when the contact spring 40 is compressed between the contact surfaces 44 and 50 thereof, the contact force exerted by the surface 44 rises substantially more rapidly than that exerted by the contact surface 50, as explained in more detail below.

The mounting and operation of the card reader 2 will now be described with particular reference to FIGS. 9, 10, 14 and 15. The card reader 2 is assembled to the circuit board 6 by inserting the spigots 26 on the frame 8 into the respective holes 28 in the circuit board 6 and heat sealing the spigots 26 thereto at their ends. In order to load the card reader 2 with a card 4, the card 4 is placed on the ledge 18 of the frame 8, (the cover 12 having first been removed therefrom) with the clipped corner 13 of the card 4 against the oblique flat 19 of the frame 8. The cover 12 is then assembled to the frame 8 in the manner described above. In said home position of the cover 12, the beads 32 thereof press against the card 4 above the gold plated contact surfaces 50 of the contact elements 10, so that the contact spring 40 of each contact element 10 is compressed between the card 4 and the circuit board 6, whereby the gold plated contact surface 50 of each contact spring 40 is pressed against a respective gold plated pad of the card 4, each tin plated contact surface 44 of each contact spring 40, being pressed against a respective tin plated pad of the circuit board 6. Thus each pad C1 to C4 of the row R1 is electrically connected to a respective pad C9 to C12 of the row R1 and each pad C5 to C8 of the row R2 is electrically connected to a respective pad C13 to C16 of the row R2' whereby the card 4 is placed in circuit in the telephone hand set.

Figure 14:
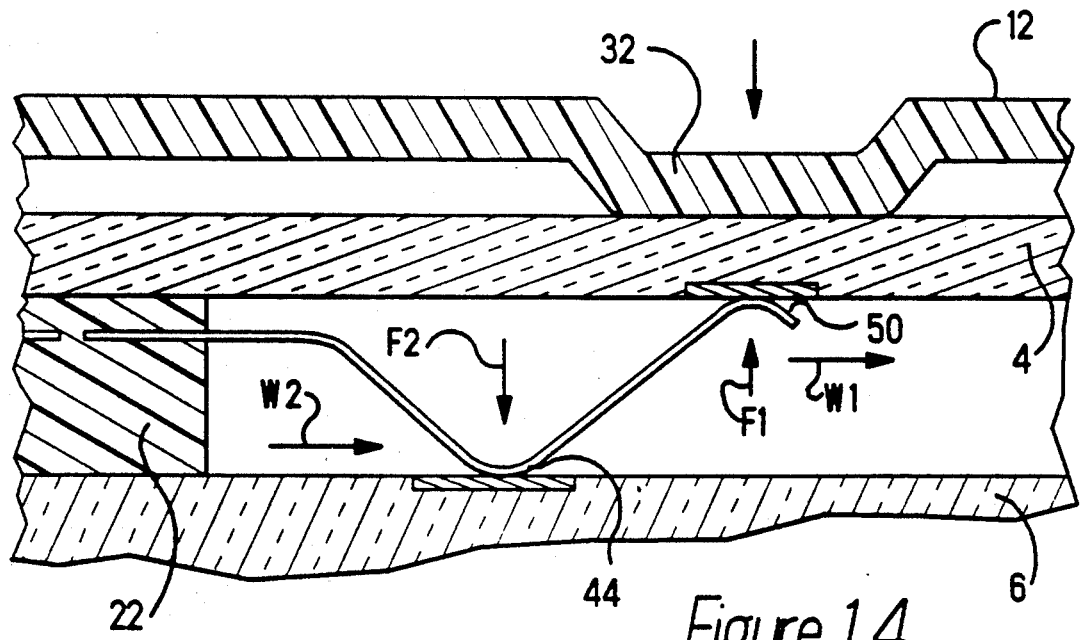
FIG. 14 is a diagrammatic fragmentary longitudinal sectional view of the card reader illustrating the operation thereof.
Figure 15:
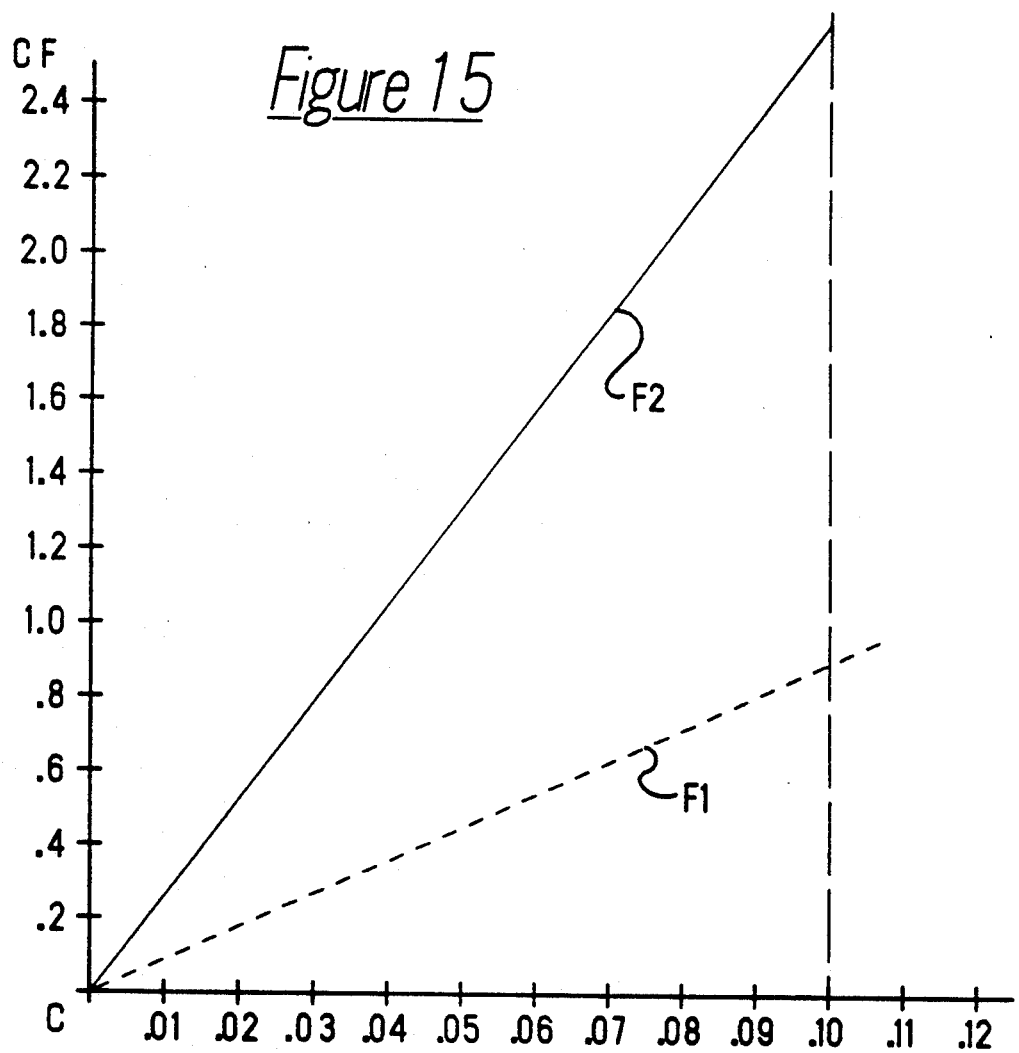
FIG. 15 is a graph illustrating an aspect of the operation of the card reader.
Figure 16:
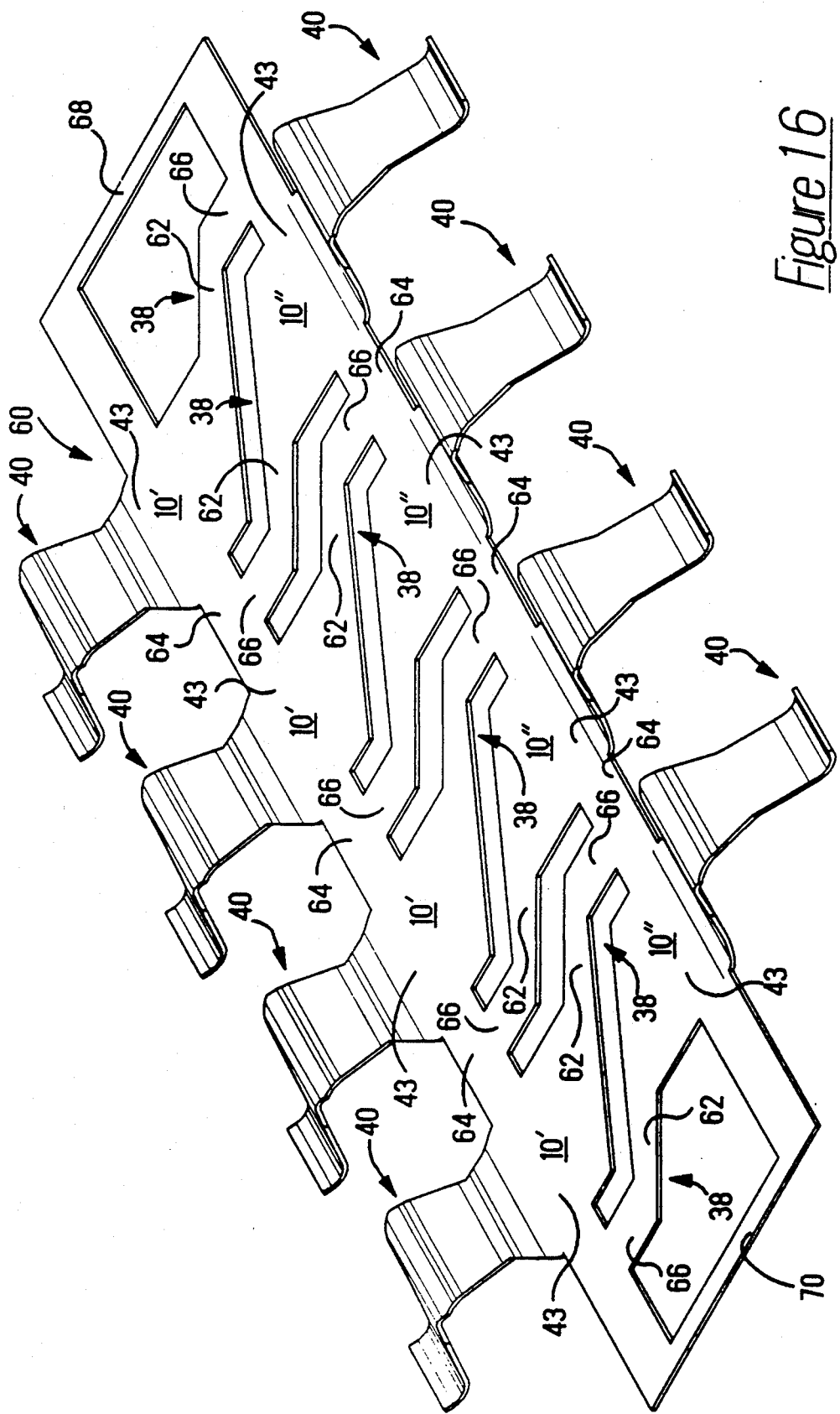
FIG. 16 is an enlarged isometric view of a sheet metal blank for molding into the support bar during the molding of the frame to provide the contact elements thereof.

As shown in FIG. 14, a contact force F1 is applied to gold plated surface of a respective pad on the card 4, by the gold plated contact surface 50 there beneath, a contact force F2 being applied to the tin plated contact surface of a respective pad of the card 6, by the tin plated contact surface 44 thereabove. As shown in FIG. 15, in which the ordinate is calibrated in newtons of contact force CF, and in which the abscissa is calibrated in millimeters of compression C of the contact spring 40, the force F2 rises much more rapidly as compression C is applied to the contact spring 40, than does the force F1, by virtue of the configuration of the contact spring 40, described above. Thus the final force F1 is much lower than the final force F2 when the cover has been assembled to its home position on the frame 8. Since the contact force needed to provide effective electrical contact between gold plated contact surfaces, is substantially lower than that needed to provide effective electrical contact between tin plated contact surfaces, each contact spring 40 is configured as described above, in order to reduce wear on the gold plated surface, bearing in mind that the card may need to be exchanged between five and ten times during the lifetime of the telephone hand set.

As indicated by the arrow W1 in FIG. 14, the gold plated contact surface 50 of the bight 46 wipes the respective pad on the card 4, in one direction during the compression of a contact spring 40, the tin plated surface 44 of the bight 42 wiping the respective pad on the board 6 in the same direction during said compression, as indicated by the arrow W2 in FIG. 14. The wipe length is a function of the geometry of the contact spring 40. The length of wipe of the surface 50 is greater than that of the surface 44. Said wiping action is for the removal of any fouling or oxide film on the contact surfaces. In the light of the foregoing it may be said that each contact spring 40 in effect comprises two contact springs which are combined in one configuration, the length and the cross sectional area of said two springs being balanced in such a way that on the circuit board side the proper contact force and wipe are provided for tin plated surfaces and on the SIM card side the proper contact force and wipe for gold plated contact surfaces are provided.

Figure 5:
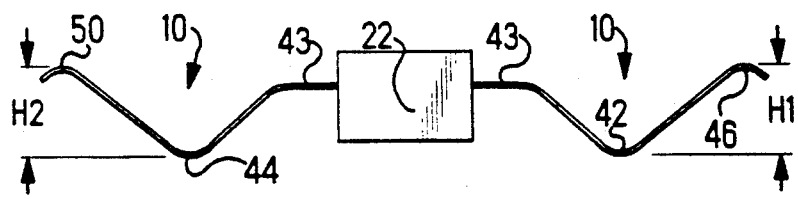
FIG. 5 is an end view of the support bar.
Figure 6:
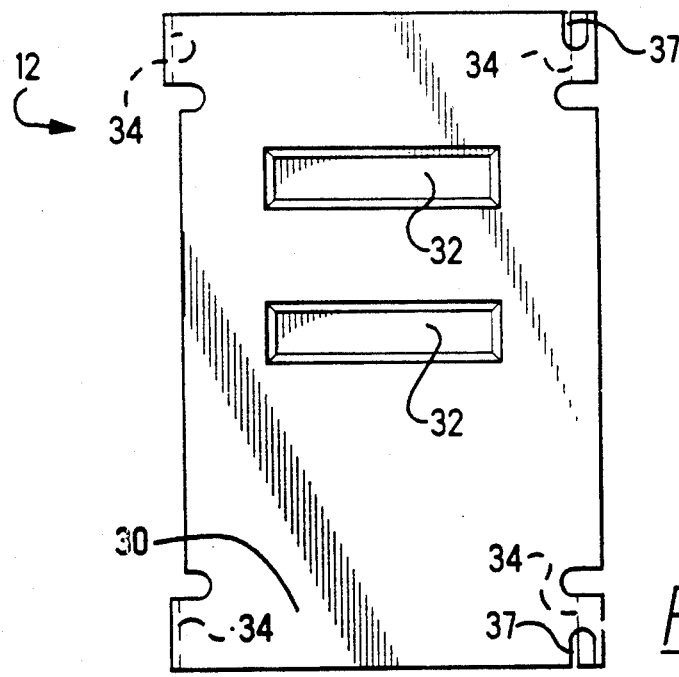
FIG. 6 is a top plan view of a metal cover for the frame.
Figure 7:
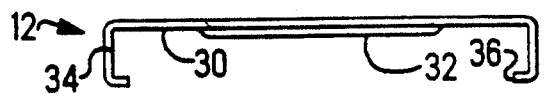
FIG. 7 is an end view of the cover.

By virtue of the construction described above, the height H1 of the bar 22 may be only 1.0 mm, the height H2 of the contact spring 40 being only 1.10 mm (FIG. 5).

Figure 3:
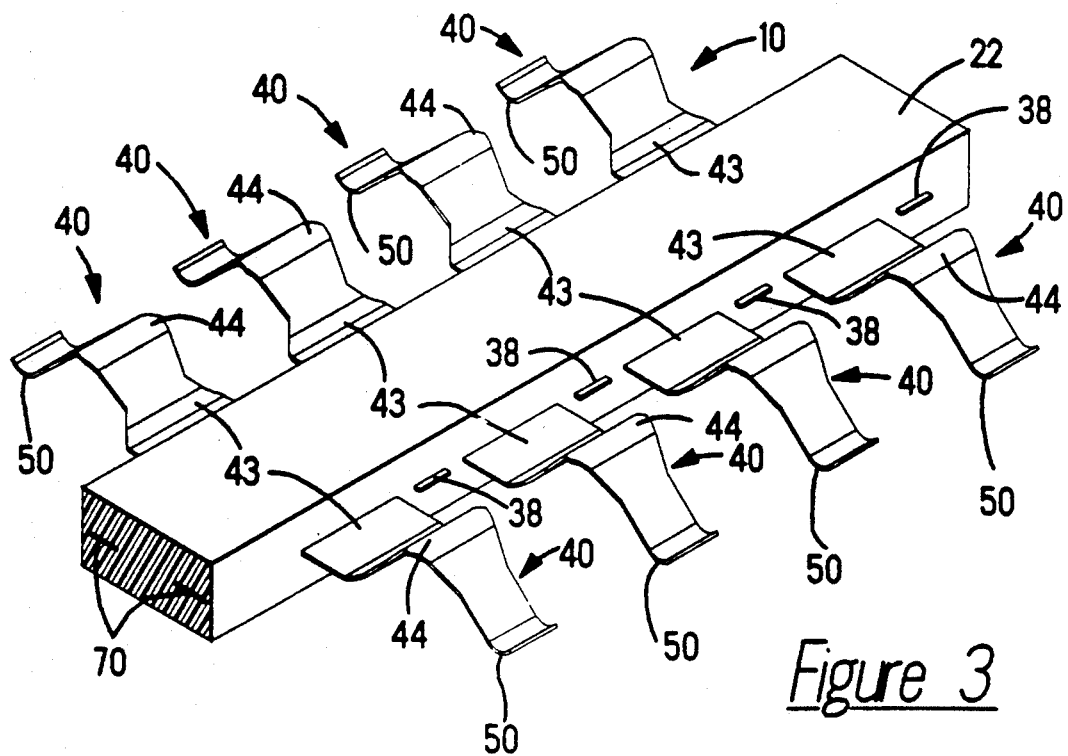
FIG. 3 is an enlarged isometric view of a contact element support bar of the frame.
Figure 4:
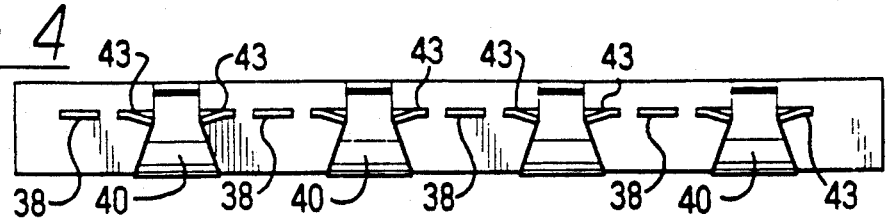
FIG. 4 is an elevational view of the support bar.

The manner in which the contact elements 10 in the bar 22 of the frame 8 are provided, will now be described with particular reference to FIGS. 3 to 5 and 16 and 17. An elongate blank 60 for providing a set of contact elements 10 molded into the bar 22 as shown in FIGS. 3 to 5, is produced from a length of sheet metal stock, by means of a conventional progressive stamping and forming operation and the gold and tin plating on the bights 50 and 42, respectively, are provided by means of a conventional selective plating process.

Figure 17:
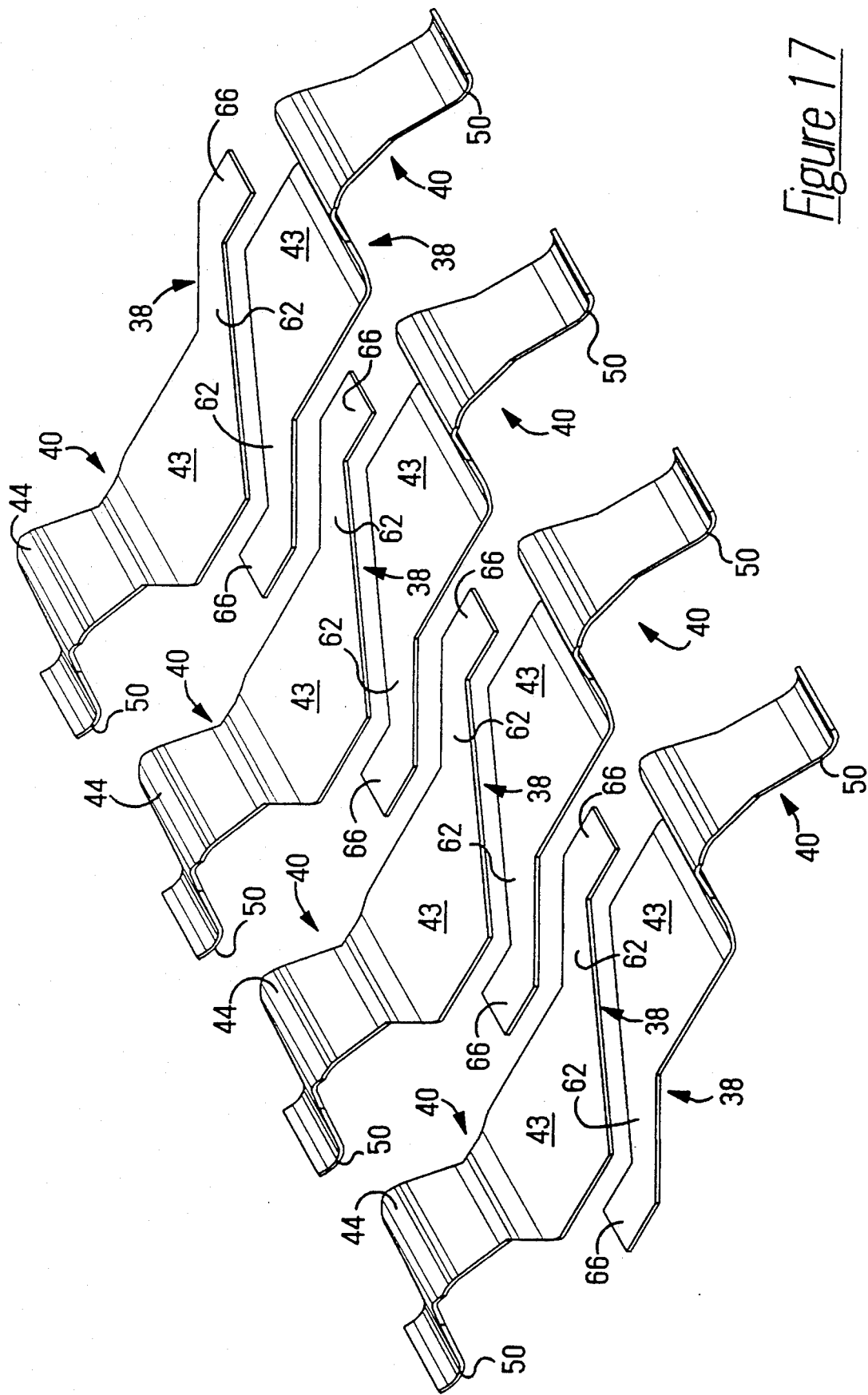
FIG. 17 is an enlarged isometric view showing the contact elements when they have been sheared from the blank.

The blank 60 comprises eight contact element blank portions 10' and 10" each consisting of a contact spring 40 and a mounting portion 38 comprising a tail 62 extending from the arm 43, of the contact spring 40, obliquely with respect to the longitudinal axis of the blank 60 and terminating in a tab-like end part 66 extending at right angles to said axis. The blank portions 10' and 10" are connected together by means of carrier strips 64 each connecting the arms 43 of each pair of adjacent contact springs 40. Each carrier strip 64 is also connected to the end part 66 of a respective mounting portion 38. Each blank portion 10' is thereby connected to the respective blank portion 10" opposite thereto in rotational symmetry, with the contact spring 40 of that blank portion 10' projecting in the opposite direction tot eh contact spring 40 of said respective blank portion 10". The tails 62,66 of the blank portions 10' are fully interdigitated with those of the blank portions 10". At one end of the blank 60, a rectangular carrier strip 68 connects the arm 43 of the contact spring 40 of the blank portion 10' at that end, with the tail end part 66 of such portion 10'. At the other end of the blank 60 a similar rectangular carrier strip 70 connects the arm 43 of the contact spring 40 the blank portion 10" at that end to, the tail end portion 66 of such portion 10". The blank 60, is then molded into the bar 22 during the molding of the frame 8. The carrier strips 68 and 70 project from opposite sides of the frame and the carrier strips 64 project from opposite sides of the bar 22. After the molding operation, all of the projecting carrier strips are sheared from the blank 60, so that all of the blank portions 10' and 10" are electrically insulated from one another as shown in FIG. 17, in which the bar 22 is not shown.

One of more further frames (not shown) identical with the frame 8 may be stacked thereon in contiguous, longitudinally aligned relationship, the latch arms of the cover being dimensioned to retain the frames 8 in such relationship with a further module card (not shown) on the ledge 18 of the, or each, further frame 8. The, or each, card in the frames 8, which is not the uppermost card is provided with contact pads on one side thereof, for engagement by the contact surfaces 50 therebeneath and with the contact pads on the other side thereof for engagement with the contact surfaces 44 thereabove.

We claim:
1. A card reader comprising a card support, a set of elongate contact springs and means for pressing contact surfaces of said contact springs into electrical contact with contact surfaces of respective electrically conductive first pads on a card on said card support and with contact surfaces of respective electrically conductive second pads on a circuit board, the contact surfaces of the first pads are of a first material and the contact surfaces of said second pads are of a second material; each contact spring has a first contact surface of said first material for engaging the contact surface of a respective first pad and a second contact surface of said second material for engaging the contact surface of the respective second pad, said first and second contact surfaces being provided on oppositely directed first and second bights spaced from each other longitudinally of the contact spring so as to provide, in effect, two independent contact springs, one for exerting a first contact force appropriate to said first material, for pressing said first contact surface against the contact surface of said first pad, and the other for exerting a second contact force appropriate to said second material, for pressing said second contact surface against the contact surface of said second pad.

2. A card reader as claimed in claim 1, wherein one end of each contact spring is connected to said card support, said first bight being provided proximate to a free end of the contact spring remote from said one end, and said second bight being provided between said ends.

3. A card reader as claimed in claim 2, wherein said bights are connected by a first rectilinear planar arm of the contact spring, said second bight being connected to a further bight which is substantially shallower than the second bight, by a second rectilinear planar arm of the contact spring said further bight merging with a third planar arm coplanar with a rectilinear planar support portion of the contact spring.

4. A card reader as claimed in claim 3, wherein said first bight is of constant width, said first arm having a part of equal constant width connected to said first bight, but increasing in width up to the crest of said second bight, said second arm decreasing in width from said crest to said further bight, the contact spring thereafter increasing in width up to a position just beyond said further bight to a width substantially exceeding that of said second bight and thereafter being of constant width up to said support portion.

5. A card reader as claimed in claim 1, wherein said first material is gold, said second material being tin, said second contact force being substantially greater than said first contact force and said contact spring being configured so that said first surface wipes along the contact surface of said first pad to a greater extend than said second contact surface wipes along the contact surface of said second pad, upon the application of said pressing means.

6. A card reader as claimed in claim 1 wherein said card support is the form of an insulating frame spanned by a support bar, each contact spring having a tail portion molded into the support bar, the frame having a peripheral card supporting ledge, said pressing means being in the form of a cover assemblable to the frame to press the card against the first contact surface of each contact spring, and thereby to press each second contact surface thereof against a respective pad on the circuit board.

7. A card reader comprising a card support, a set of contact springs and means for pressing contact surfaces of said contact springs into electrical contact with contact surfaces of electrically conductive first pads on a card on said card support and with contact surfaces of respective electrically conductive second pads on a circuit board; said card support is in the form of an elongate insulating frame spanned transversely thereof by a support bar and having a peripheral card supporting upper ledge, at least one row of contact springs each having a support portion molded into said bar, the contact springs projecting from the bar in parallel relationship lengthwise of the frame, the frame having means for securing it to the circuit board with a lower face of the frame thereagainst, each contact spring having an upwardly bowed contact surface for engaging a respective one of said first pads and a downwardly bowed contact surface for engaging a respective one of said second pads, said pressing means comprising a cover which can be secured to said frame to press a card on said ledge down against said first contact surfaces thereby to press said second contact surfaces against said second pads.

8. A card reader as claimed in claim 7, wherein the contact springs are arranged in two rows, the contact springs of one row projecting from one side of the bar and those of the other row projecting from the opposite side thereof, each contact spring of one row being aligned with a contact spring of the other row, the support portions comprising cranked parts, the cranked parts of the support portions of the contact springs of one row being interdigitated with the cranked parts of the support portions of the contact springs of the other row.

9. A card reader as claimed in claim 8 wherein the cover is formed with downwardly directed beads, each of which is aligned with the first contact surfaces of the contact springs of a respective row thereof when the cover has been assembled to the frame.

10. A card reader as claimed in claim 7, wherein the cover has latch arms which are resiliently deflectable by cam surfaces on side walls of the frame to latch the cover to the frame, the frame and the cover having openings for receiving a tool blade for releasing the cover from the frame.

11. A card reader as claimed in claim 7, wherein further frames identical with said elongate insulating frame are stacked thereon in contiguous, longitudinally aligned relationship, the cover having means for retaining said frames in their stacked relationship, with a card on the card supporting ledge of each frame, each card other than the upper most card being provided with said first contact pads on both sides thereof for engagement by the contact surfaces thereabove and therebelow.

* * * * *